(12) United States Patent
Keller (10) Patent No.: US 7,390,419 B2
(45) Date of Patent: Jun. 24, 2008

(54) WASTE WATER RECOVERY SYSTEM

(75) Inventor: James C. Keller, Lakeland, FL (US)

(73) Assignee: Con-Serv Manufacturing, Lakeland, FL (US)

( * ) Notice: Subject to any disclaimer, the term of this patent is extended or adjusted under 35 U.S.C. 154(b) by 540 days.

(21) Appl. No.: 11/060,112

(22) Filed: Feb. 17, 2005

(65) Prior Publication Data

US 2006/0180528 A1 Aug. 17, 2006

(51) Int. Cl.
*B01D 35/12* (2006.01)
(52) U.S. Cl. .................... 210/798; 15/DIG. 2; 134/110; 134/111; 134/123; 210/139; 210/167.01; 210/333.01; 210/411; 210/414; 210/422; 210/427; 210/805
(58) Field of Classification Search .............. 15/DIG. 2; 134/109–111, 104.1, 123; 210/108, 134, 210/138, 139, 141–143, 167.01, 167.3, 258, 210/333.01, 333.1, 340, 341, 411–413, 424–427, 210/797, 805, 414, 422
See application file for complete search history.

(56) References Cited

U.S. PATENT DOCUMENTS

| | | | |
|---|---|---|---|
| 3,414,129 A | 12/1968 | Going et al. | |
| 3,436,899 A | 4/1969 | Pausch | |
| 3,749,168 A | 7/1973 | Hall, Sr. | |
| 3,849,309 A | 11/1974 | Morris | |
| 4,029,114 A * | 6/1977 | Wiltrout ................... | 134/104.1 |
| 4,053,410 A | 10/1977 | Lorimor | |
| 4,179,372 A | 12/1979 | Rosaen | |
| 4,218,227 A | 8/1980 | Frey | |
| 4,331,459 A | 5/1982 | Copley | |
| 4,359,330 A | 11/1982 | Copley | |
| 4,419,240 A | 12/1983 | Rosaen | |
| 4,452,616 A | 6/1984 | Gillingham et al. | |
| 4,455,823 A | 6/1984 | Bly et al. | |
| 4,486,205 A | 12/1984 | Nishiyama | |
| 4,495,068 A | 1/1985 | Rosaen | |

(Continued)

OTHER PUBLICATIONS

Sonny's Enterprises, Inc. "SRC100 Reclaim Unit, Installation & Operation". Product Manual, Publication date / status as potential prior art unknown. Provided unsolicited by a competitor. Publication/Origin dates specifically requested in writing from SoBrite Legal Counsel (the reclaim unit manufacturer and source of document). Request has been ignored, apparently undated.

(Continued)

*Primary Examiner*—Joseph W Drodge
(74) *Attorney, Agent, or Firm*—Babcock IP, PLLC (57) ABSTRACT

A waste water recovery system to filter and recirculate waste water to a wash system including a fluid recovery line, a fluid supply line and a fluid backwash line comprising a filter assembly including a water filtering section to receive waste water from the wash system and to recirculate filtered water to the wash system and a filter backwash section to selectively clean the water filtering section when a system condition exists, and a fluid control including a plurality of valve assemblies operatively coupled between the wash system, the water filtering section and the filter backwash section to selectively control the circulation of water through the water filtering section to recirculate the recovery water to the wash system and to periodically clean the water filtering section.

19 Claims, 9 Drawing Sheets

U.S. PATENT DOCUMENTS

| | | |
|---|---|---|
| 4,536,200 A | 8/1985 | Reist |
| 4,544,389 A | 10/1985 | Howeth |
| 4,559,066 A | 12/1985 | Hunter et al. |
| 4,560,396 A | 12/1985 | O'Dell |
| 4,592,848 A | 6/1986 | Pabst |
| 4,661,131 A | 4/1987 | Howeth |
| 4,704,210 A | 11/1987 | Boze et al. |
| 4,721,563 A | 1/1988 | Rosaen |
| 4,943,379 A | 7/1990 | Boze et al. |
| 4,970,004 A | 11/1990 | Rosaen |
| 5,128,028 A | 7/1992 | Lamort |
| 5,160,430 A * | 11/1992 | Gasser et al. ............... 210/138 |
| 5,462,678 A | 10/1995 | Rosaen |
| 5,670,038 A | 9/1997 | McKinney |
| 5,908,550 A * | 6/1999 | Kaipainen ............... 210/167.3 |
| 5,951,874 A | 9/1999 | Jangbarwala et al. |
| 6,165,048 A | 12/2000 | Russ et al. |
| 6,474,289 B1 | 11/2002 | Lilly et al. |

OTHER PUBLICATIONS

Sobrite Filtermatic2 Reclaim System, "Aquaprep Dual Filter Module, Owners Manual and Installation Guide". Product Manual, Publication date / status as potential prior art unknown. Provided unsolicited by a competitor. Publication/Origin dates specifically requested in writing from SoBrite Legal Counsel (the reclaim unit manufacturer and source of the document). Request has been ignored, apparently undated.

* cited by examiner

WASTE WATER RECOVERY SYSTEM

BACKGROUND OF THE INVENTION

1. Field of the Invention

A waste water recovery system to filter and recirculate waste water from and to a wash system.

2. Description of the Prior Art

Numerous efforts have been made to design an efficient system to recover and recirculate waste water from car washes and other industrial processes. Such designs typically incorporate self-cleaning capabilities to periodically clean filtering devices common to these systems. In order to provide essentially continuous or uninterrupted operation of such wash systems, a secondary supply or source of water is needed during the filter cleaning phase.

Filter devices often include a filter element and an air purge using the fluid in the filter device to dislodge the particulate contaminants adhering to the surface of the filter element and to force the particulate contaminates from the filter device.

However, a need remains to construct a reliable means to provide a virtually uninterrupted flow of recovered water to the car wash or other industrial process.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
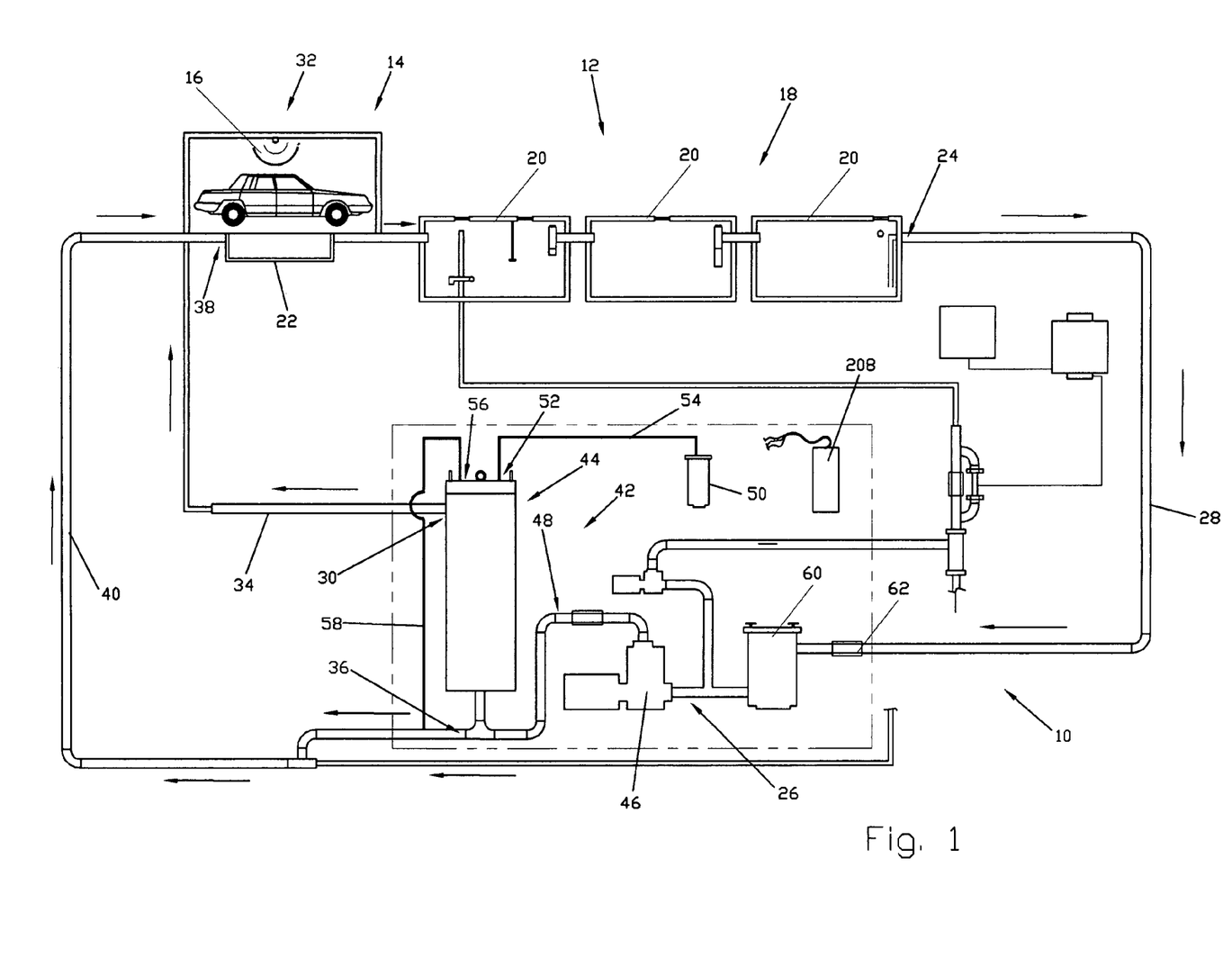
FIG. 1 is a schematic diagram of the waste water recovery system of the present invention and a wash system.

As shown in FIG. 1, the present invention relates to a waste water recovery system generally indicated as 10 to filter and recirculate waste water from a wash system generally indicated as 12 such as a car wash or other industrial process. The wash system 12 comprises a wash device generally indicated as 14 including a wash water applicator 16, a waste water recovery reservoir generally indicated as 18 including a plurality of recovery tanks each indicated as 20 and a drain sump 22. A fluid recovery outlet 24 of the waste water recovery reservoir 18 of the wash system 12 is coupled to a fluid recover inlet 26 of the waste water recovery system 10 by a fluid recovery line 28, a fluid supply outlet 30 of the waste water recovery system 10 is coupled to a fluid supply inlet 32 of the wash device 14 of the wash system 12 by a recovered water supply line 34 and a fluid backflush outlet 36 of the waste water recovery system 10 is coupled to a fluid backwash inlet 38 of the drain sump 22 of the wash system 12 by a fluid backwash line 40.

As shown in FIGS. 1 through 4, the waste water recovery system 10 comprises a filter assembly including a water filtering section generally indicated as 42 including a pair of filters each generally indicated as 44 and a pair of fluid circulating pumps each indicated as 46 coupled thereto by a pump outlet conduit arrangement generally indicated as 48 to continuously filter wash water from the wash system 12 when the wash system is operating and to recirculate the filtered water to the wash device 14 of the wash system 12. The waste water recovery system 10 further comprises a filter backwash or cleaning section including a pressurized purge air source 50 coupled to each filter 44 through a purge air inlet 52 by a pressurized purge air supply line 54 and to the fluid backwash line 40 through a fluid purge outlet 56 by a fluid purge line 58 exists to selectively clean each of the filters 44 when certain system condition as described more fully hereinafter. Disposed between the fluid recovery outlet 24 and the fluid recovery inlet 26 is a basket strainer 60 and a check valve assembly 62.

The waste water recovery system 10 also includes a fluid control comprising a plurality of valve assemblies operatively coupled between the wash system 12, the water filtering section 42 and the filter backwash or cleaning section to selectively control the circulation of water through each filter 44 to recirculate the recovery water to the wash system 12 and to periodically clean each filter 44 separately.

Figure 2:
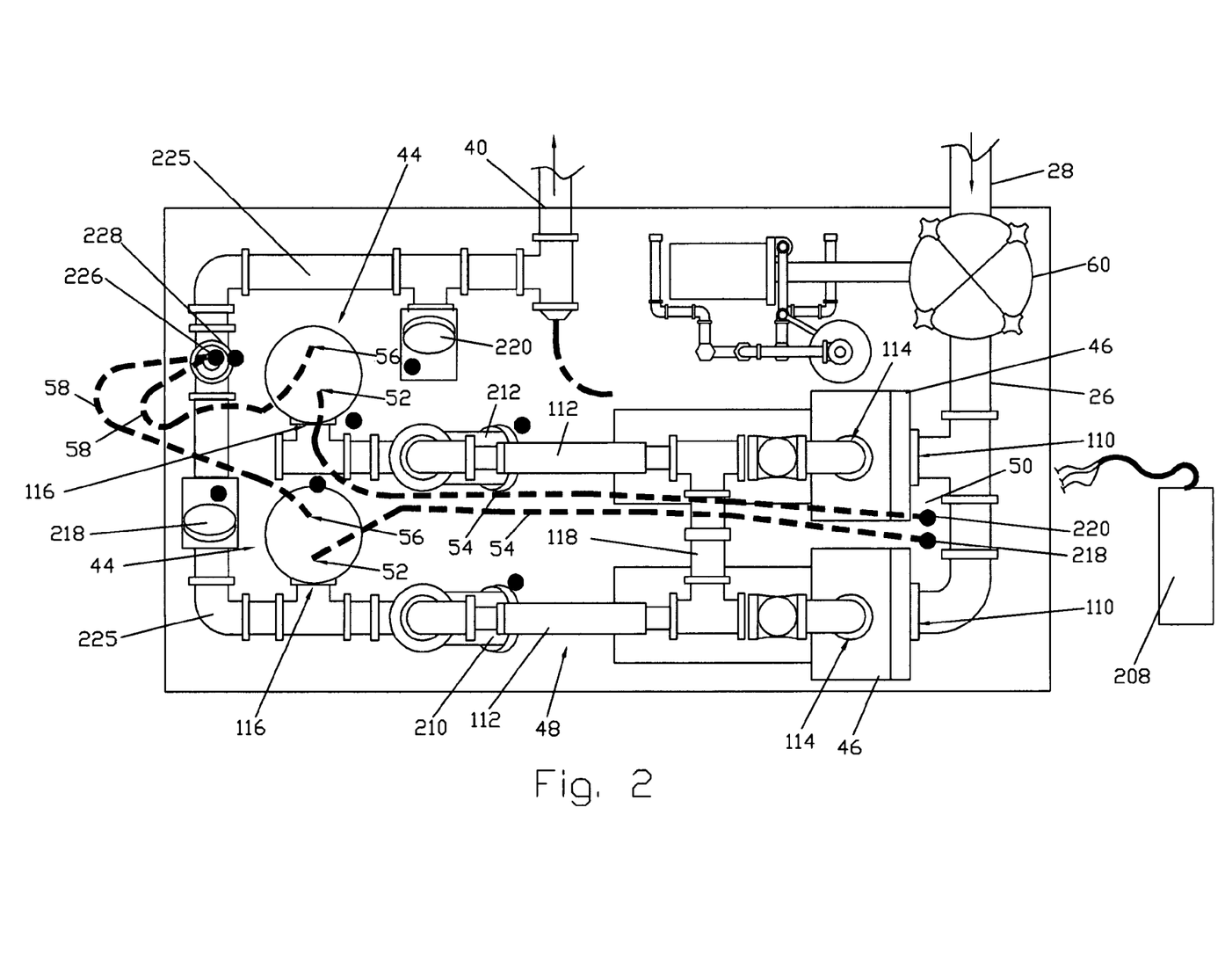
FIG. 2 is a top view of the waste water recovery system of the present invention.

As shown in FIG. 2, the pump inlet 110 of each circulating pump 46 is coupled to the fluid recovery line 28 by the fluid recovery inlet 20 to receive wash water to be filtered by the filters 44 as described hereinafter. The pump outlet conduit arrangement 48 comprising a pump outlet conduit 112 coupled between a pump outlet 114 and a filter port 116 formed in the lower portion of the corresponding filter 44 and a cross-flow or interconnecting pump outlet conduit 118 coupled between the pump outlet conduits 112.

Figure 3:
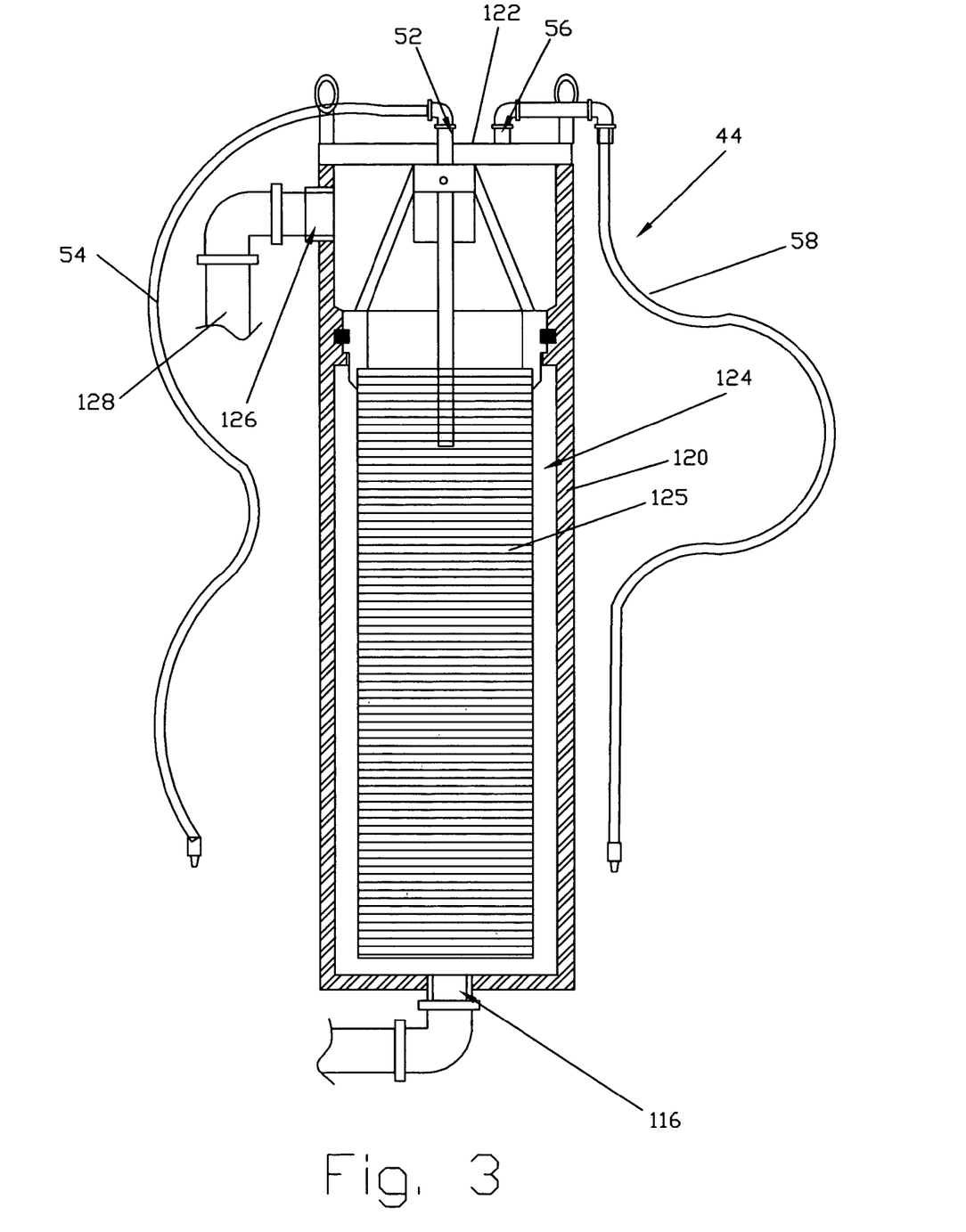
FIG. 3 is a detailed cross-sectional view of the waste water recovery system of the present invention.
Figure 4:
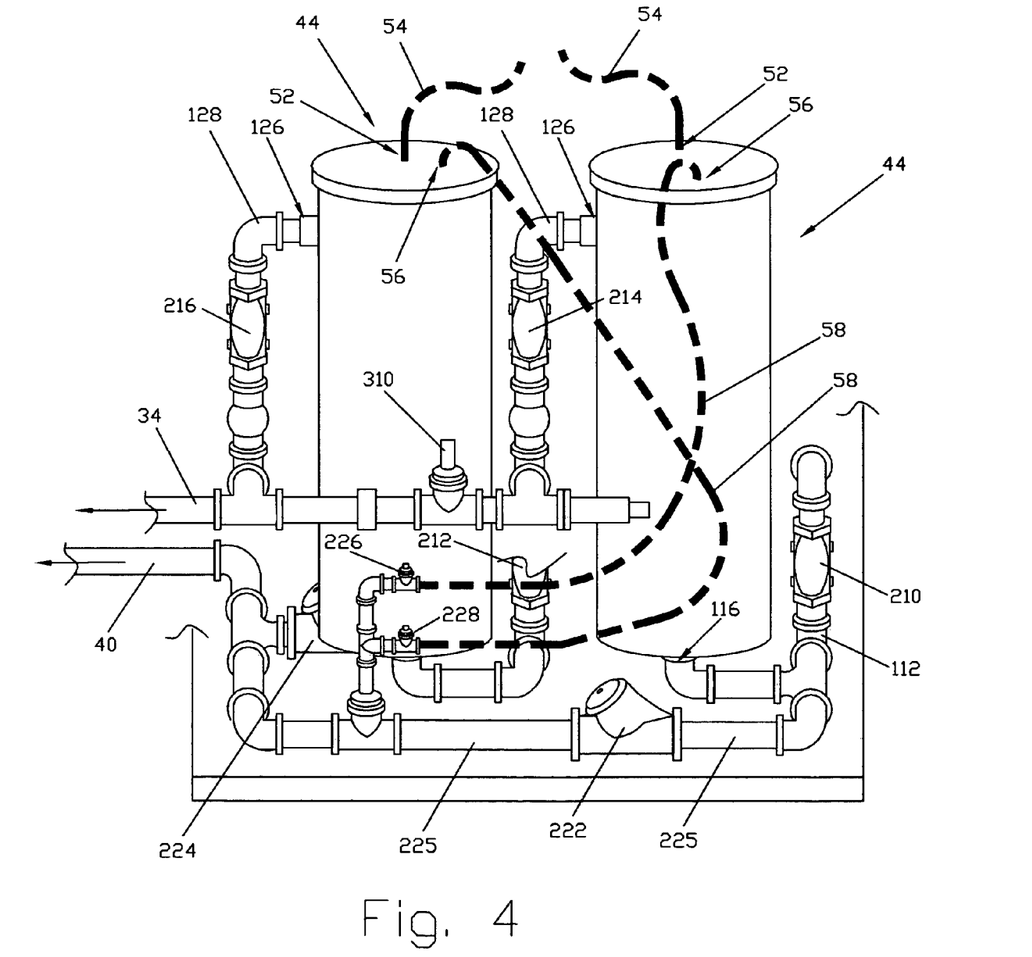
FIG. 4 is a partial end view of the waste water recovery system of the present invention.

As shown in FIG. 3, each filter 44 comprises an outer housing or shell 120 and an upper cover 122 to cooperatively form a filter chamber 124 to operatively receive a filter element or member 125 therein to filter water entering the filter chamber 124 through the filter port 116 and a filter outlet 126 formed in the upper portion of the filter 44 coupled to the fluid supply line 34 by a corresponding filter outlet conduit 128 to selectively feed filtered recovery water to the wash system 12.

The waste water recovery system 10 further includes a fluid control including a plurality of valve assemblies operatively coupled between the wash system 12, the water filter section and the filter backwash or cleaning section and a control section 208 including control logic to control the position or state of each of the plurality of valve assemblies in accordance with a sequence of modes or configurations and duration of time or sensed pressure. Specifically, the plurality of valve assemblies comprises a first and second filter inlet valve assembly indicated as 210 and 212 respectively each coupled between one of the filter ports 116 and the pump outlets 114 through the pump outlet conduits 112 and 118 to selectively control the flow of waste water from the circulating pumps 46 to the corresponding filter(s) 44, a first and second filter outlet valve assembly indicated as 214 and 216 respectively each coupled between one of the filter outlets 126 and the recovered water supply line 34 to selectively control the flow of recovered water from the corresponding filter(s) 44 to the wash system 12, a first and second backwash/purge inlet valve assembly 218 and 220 respectively each coupled between the pressurized purge air source 50 to selectively control the flow of pressurized air into the air chamber 124 of the corresponding filter 44, a first and second backflush outlet valve assembly 222 and 224 respectively each coupled between one the filter ports 116 and the fluid backwash line 40 by a backwash conduit 225 to feed backwash to the drain sump 22 and a first and second purge outlet valve assembly 226 and 228 respectively each coupled to one of the purge air outlets 56 by one of the purge air conduits 58 to feed purge air to the drain sump 22.

The waste water recovery system 10 is selectively operable in a full filter mode where both filters 44 filter waste water, a dual mode where one of the filters 44 is filtering waste water and the other filter 44 is backwashed or cleaned while the wash system 10 is operating, and a backwash mode where one of the filters 44 is cleaned.

Figure 5:
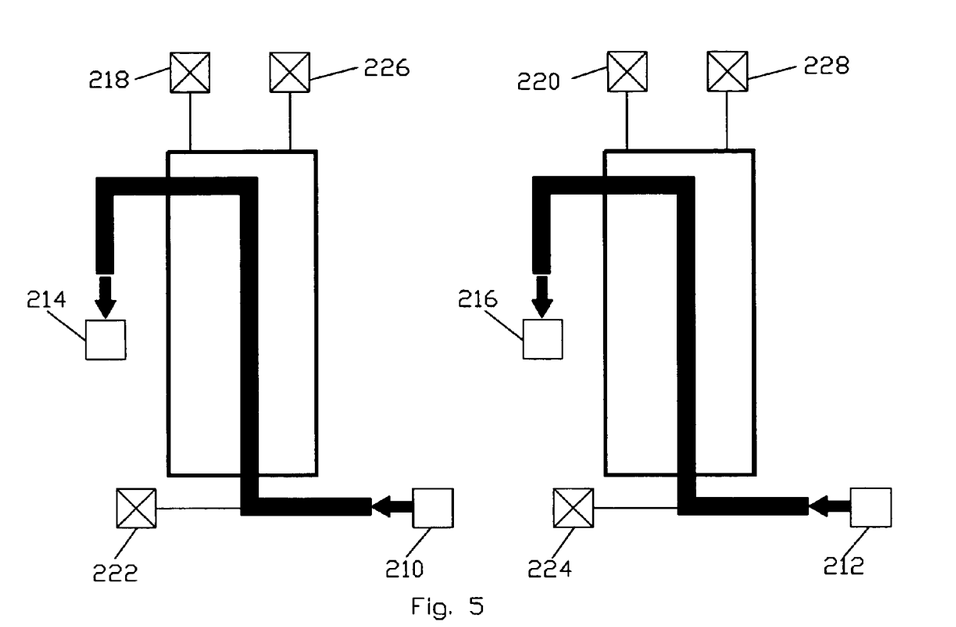
FIG. 5 depicts the position or state of the valve assemblies of the waste water recovery system of the present invention when in the full filter mode or configuration.

As shown in FIG. 5, when the wash system 12 is in use, and the waste water recovery system 10 is operating in a normal service cycle, the control logic of the control section causes the first filter inlet valve assembly 210 and the first filter outlet valve assembly 214 to be open permitting waste water feed from the corresponding pump 46 to flow through the filter port 116, the filter member or medium 125 and out the filter outlet 126. Similarly, the second filter inlet valve assembly 212 and the second filter outlet valve assembly 216 are open permitting waste water from the other pump 46 to flow through the filter member or medium 125 and out the filter outlet 126 of the other filter 44. The remaining valve assemblies 218, 222 and 226, and 220, 224 and 228 are in the closed position. So configured, the waste water recovery system 10 is operating in the full filter mode.

Figure 6:
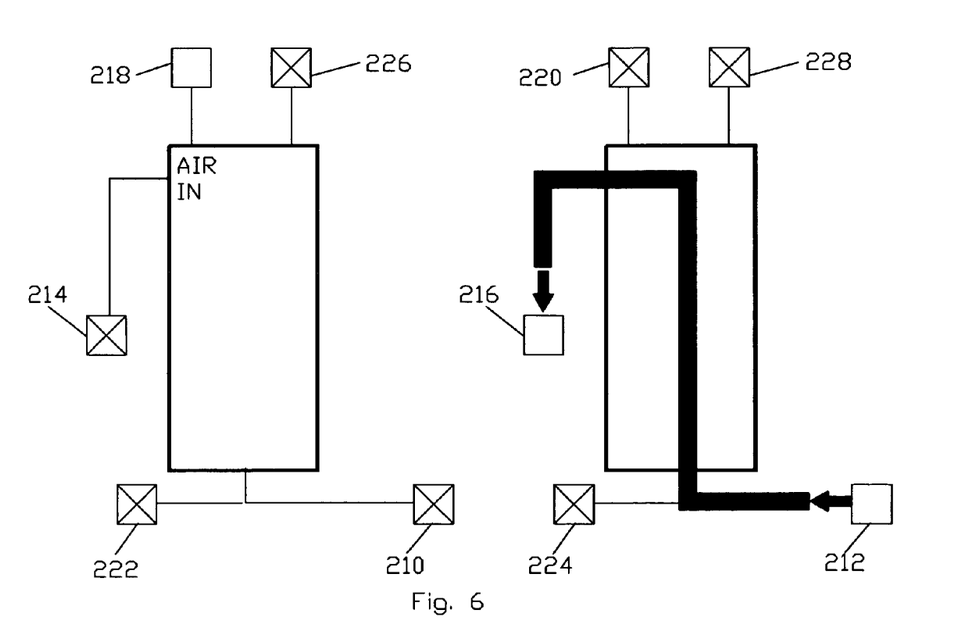
FIGS. 6 and 7 depict the position of state of the valve assemblies of the waste water recovery system of the present invention when one of the filters is in the backflush mode or configuration.

After a predetermined period of time, such as about 4 minutes, the control logic of the control section will cause one of the filters 44 to transition to the cleaning or backwash mode including a backflush stage and a purge stage. As shown in FIG. 6, the valve assembly 218 is opened and 210, 214, 222 and 226 of the filters 44 to be cleaned are closed, stopping the flow of water to the first filter 44 and to feed air from the pressurized air source 50 through the air inlet 132 to charge or pressurize the filter chamber 124. The position or state of the valve assemblies 212, 216, 220, 224 and 228 of the other or second filter 44 remains unchanged allowing water to continue to filter therethrough.

Figure 7:
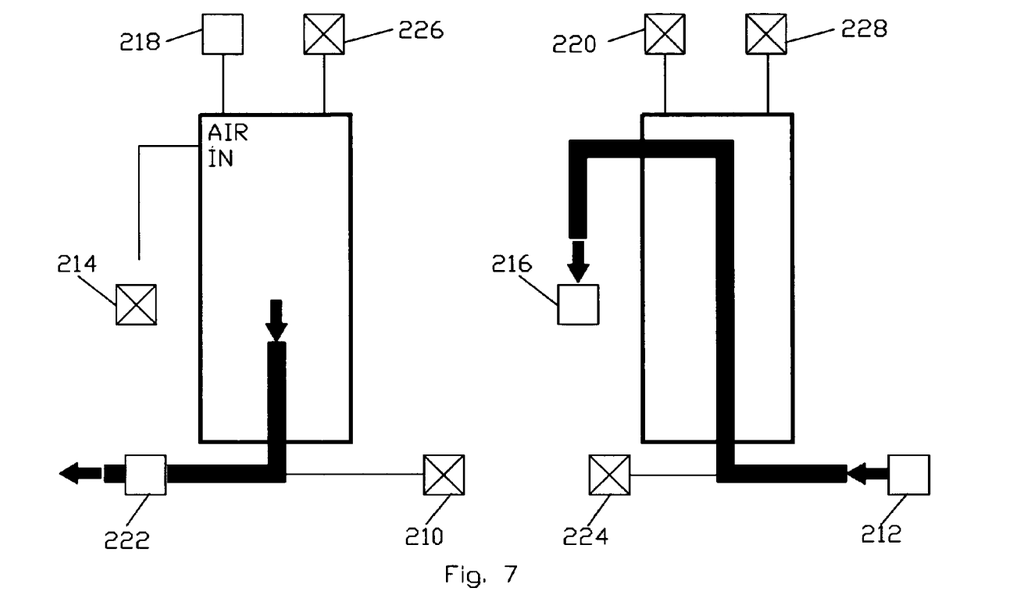

After the filter chamber 124 is charged for a predetermined period of time such as about 4 seconds with the valve assembly 218 remaining open, the first backflush outlet valve assembly 222 is opened for a predetermined period of time such as 4 seconds. The other valve assemblies 210, 214 and 226 remain closed, allowing water to be backflushed through the filter medium or member 125 through the filter port 116, and the fluid backwash line 40 to the drain sump 22 as shown in FIG. 7.

Figure 8:
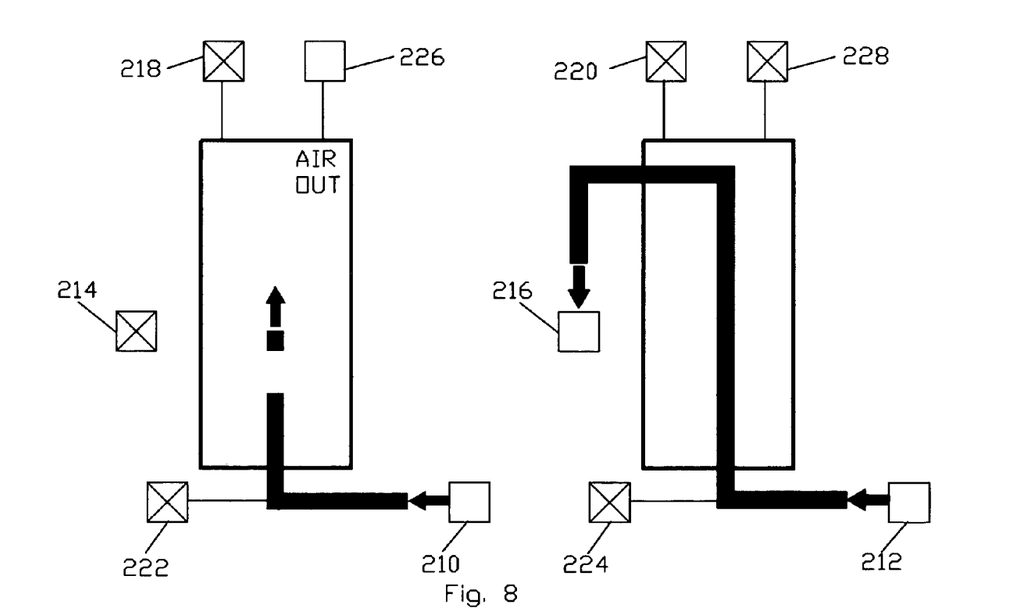
FIG. 8 depicts the position of state of the valve assemblies of the waste water recovery system of the present invention when the filter is in the purge mode or configuration.
Figure 9:
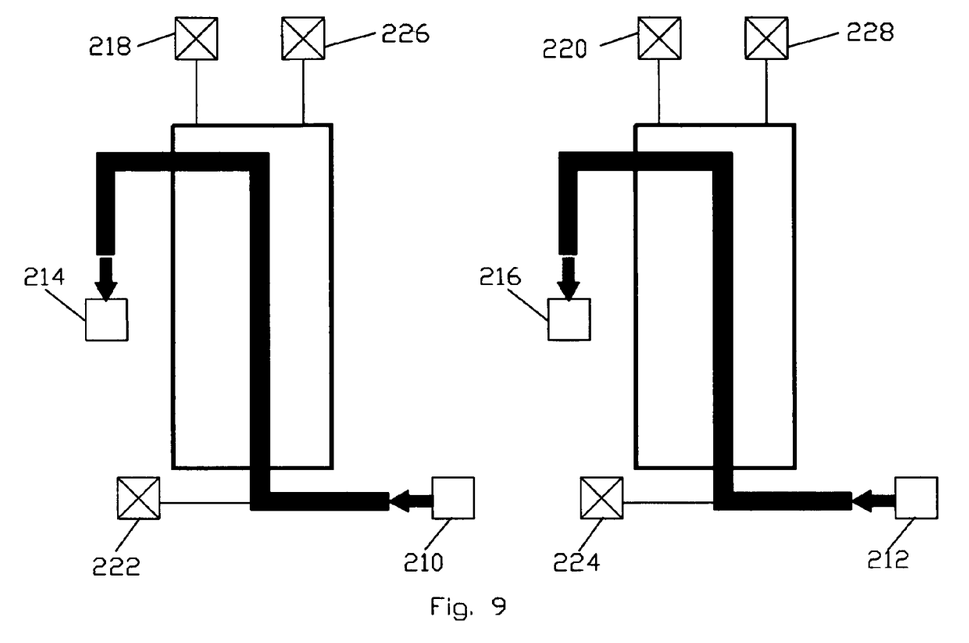
FIG. 9 depicts the position of state of the valve assemblies of the waste water recovery system of the present invention when in the full filter mode or configuration after the first filter has completed the backwash cycle.

After a predetermined period of time, such as about 9 seconds, the valve assemblies 218 and 222 are closed as the valve assemblies 210 and 226 and opened. The valve assembly 214 remains closed as shown in FIG. 8. This allows water to flow from the pump assembly through the filter port 116 forcing the air from the filter chamber 125 through the purge outlet 136 purging the recovery tank 20 of air through the purge conduit 138 and the fluid backwash line 40 to the drain sump 22. The valve assembly 226 is closed and the valve assembly 214 is opened returning the waste water recovery system 10 to the full filter mode with both filters 44 filtering waste water as shown in FIG. 9. This backwash cycle of backflushing and purging the first filter 44 by controlling the valve assemblies 210, 214, 218, 222 and 226 may be completed once or twice.

Figure 10:
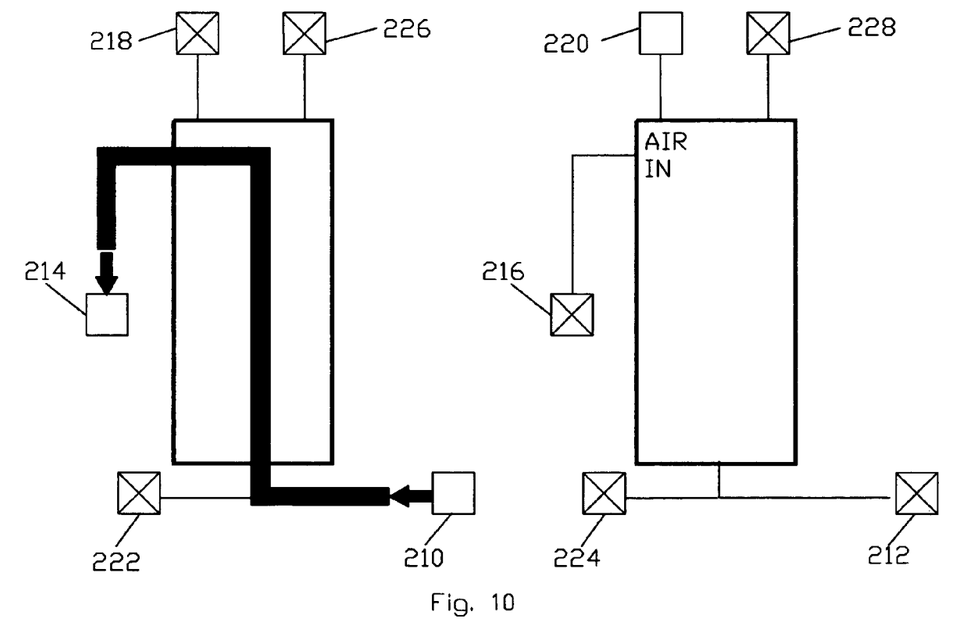
FIGS. 10 and 11 depict the position of state of the valve assemblies of the waste water recovery system of the present invention when the other filter is in the backwash mode or configuration.
Figure 11:
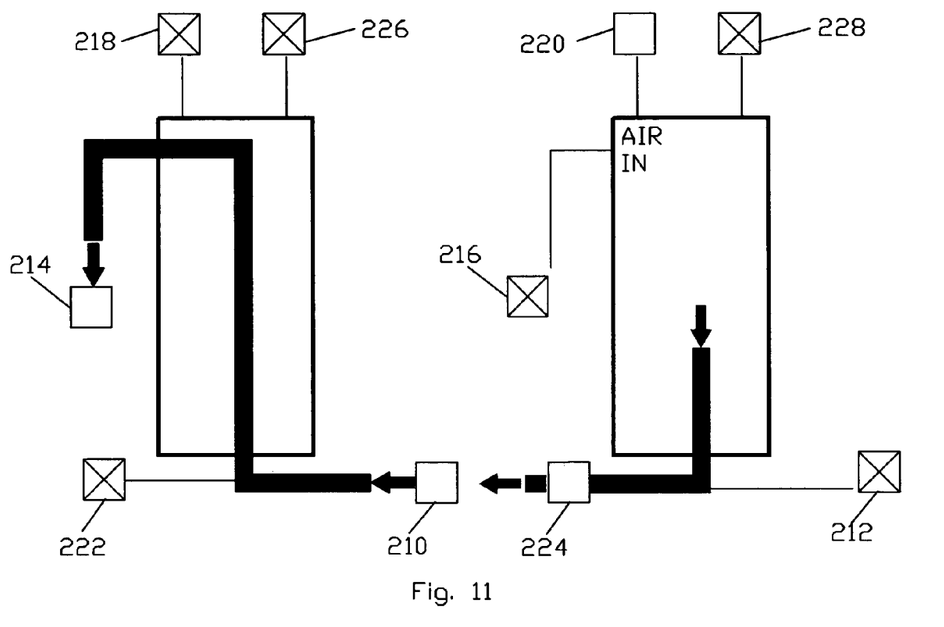
Figure 12:
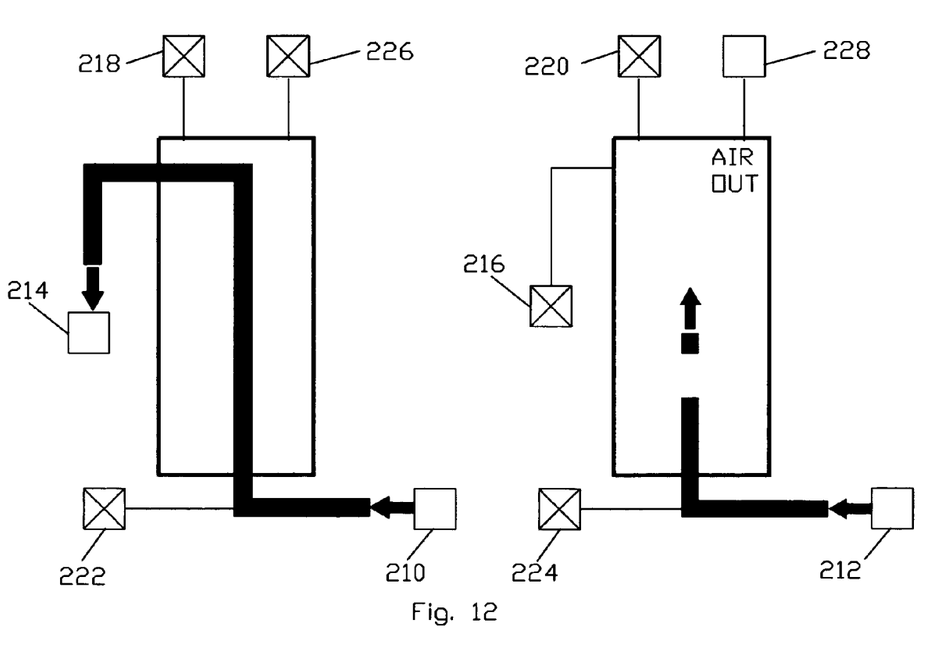
FIG. 12 depicts the position of state of the valve assemblies of the waste water recovery system of the present invention when the second filter is in the purge mode or configuration.
Figure 13:
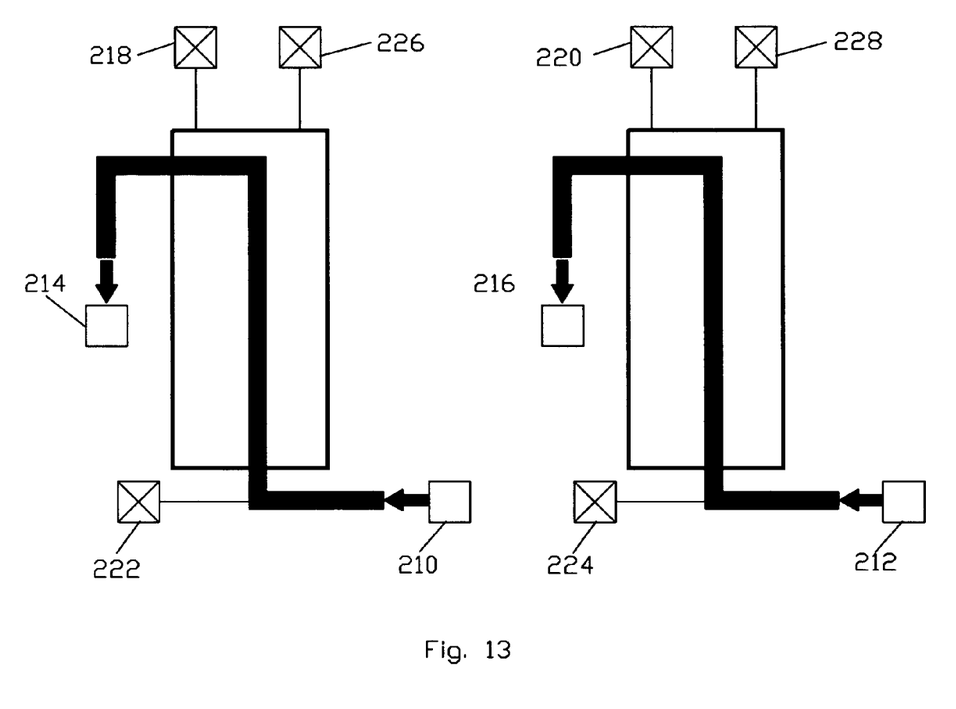
FIG. 13 depicts the position of state of the valve assemblies of the waste water recovery system of the present invention when in the full flush mode or configuration after the second filter has completed the backwash cycle.

After a predetermined period of time, such as about 10 seconds, the control logic starts the backwash cycle including the backflush and purge stages for the other filter s 44 similar to that of the first filter 44 as shown in FIGS. 10 through 12.

The control section will continue to cycle the filters 44 so long as the wash system 12 is operating. When the wash system 12 is not operating, the control section will automatically backwash the filters 44 from time to time.

The cross-flow or interconnecting pump outlet conduit 118 allows the pumps 46 to feed both filters 44 when in the full filtering mode and either filters 44 when the other filter is in the backwash mode to maintain a substantially constant volume of water filtering.

What is claimed is:

1. A waste water recovery system to filter and recirculate waste water to a wash system including a fluid recovery line, a fluid supply line and a fluid backwash line comprising:

a filter assembly including a water filtering section, to receive waste water from the wash system and to recirculate filtered water to the wash system and a filter backwash section to selectively clean said water filtering section when a predetermined system condition exists and a fluid control including a plurality of valve assemblies operatively coupled between the wash system, said water filtering section and said filter backwash section to selectively control the circulation of water through said water filtering section to recirculate the recovery water to the wash system and to clean said water filtering section in a backwash mode to said fluid backwash line when the predetermined system condition exists and a control section including control logic to control the operation of said plurality of valve assemblies;

the filter assembly provided with at least one filter, each of the at least one filter(s) having a filter chamber containing a filter element dividing the filter chamber between a filter outlet side having a filter outlet and a filter port side, a pressurized air source coupled to an air purge inlet on the filter outlet side;

the valve assemblies including an air purge outlet located on the filter outlet side of the filter element, the air purge outlet coupled to said fluid backwash line for exhausting air introduced into the filter assembly during the backwash mode, the fluid backwash line coupled to the filter port side.

2. The waste water recovery system of claim 1 wherein said water filter section includes a pair of filters and a pair of fluid circulating pumps each including a pump inlet and a pump outlet coupled thereto by a pump outlet conduit arrangement to continuously filter wash water from the wash system when the wash system is operating and to recirculate the filtered water to the wash device of the wash system.

3. The waste water recovery system of claim 2 wherein said pump inlet of each said fluid circulating pump is coupled to the fluid recovery line to receive wash water to be filtered by said filter assembly, said pump outlet conduit arrangement comprising a pump outlet conduit coupled between said pump outlet of each said fluid circulating pump and a filter port formed in the lower portion of each said filter.

4. The waste water recovery system of claim 3 wherein an interconnecting pump outlet conduit is coupled between said pump outlet conduits.

5. The waste water recovery system of claim 4 wherein said interconnecting pump outlet conduit allows said fluid circulating pumps to feed both said filters when operating in said full filtering mode and one of said filter when in said dual mode to maintain a substantially constant volume of water filtering.

6. The waste water recovery system of claim 1 wherein the water filter section includes at least two filters;
said waste water recovery system selectively operable in a full filter mode where each of the filter(s) filter waste water and a dual mode where at least one of said filters operates in a backwash mode to clean said filter, while the other filter(s) filter waste water during operation of the wash system.

7. The waste water recovery system of claim 1 wherein the water filter section includes a plurality of filters; and
said filter backwash section includes a pressurized purge air source coupled to each said filter through a purge air inlet by a corresponding pressurized purge air supply line and to said fluid backwash line through a corresponding fluid purge outlet by a fluid purge line to selectively clean said filters.

8. The waste water recovery system of claim 7 wherein during a backwash stage, the control system opens the purge air inlet for a predetermined period of time.

9. The waste water recovery system of claim 7 wherein each of said valve assemblies comprises a filter inlet valve assembly coupled between a filter port and a pump outlet through a pump outlet conduit to selectively control the flow of waste water from at least one fluid circulating pump to said filters, a filter outlet valve assembly each coupled between one of said filter outlets and the recovered water supply line to selectively control the flow of recovered water from said filters to the wash system, a first and second backwash/purge inlet valve assembly each coupled to said pressurized purge air source to selectively control the flow of pressurized air into said filter chamber of said corresponding filter, a first and second backflush outlet valve assembly each coupled between one said filter port and said fluid backwash line by a backwash conduit to feed backwash to a drain sump and a first and second purge air outlet valve assembly each coupled to the respective purge air outlet by a purge air conduit to feed purge air to the drain sump.

10. The waste water recovery system of claim 1 wherein the predetermined system condition is a time period.

11. The waste water recovery system of claim 1 wherein the water filter section includes a plurality of filters; and
each of said filters comprises an outer housing including a filter chamber having a filter element disposed therein to filter water entering said filter chamber through a filter port formed in the lower portion of said outer housing, said outer housing having a filter outlet formed in the upper portion thereof coupled to the fluid supply line by a corresponding filter outlet conduit to selectively feed filtered recovery water to the wash system.

12. A method for operating a waste water recovery system to filter and recirculate waste water to a wash system including a fluid recovery line, a fluid supply line and a fluid backwash line, comprising the steps of
circulating water from the fluid recovery line through a plurality of filters to the fluid supply line during a full filter mode;
upon a predetermined system condition initiating a backwash mode for at least one of the filters wherein the at least one filter(s) in backwash mode is isolated from the fluid recovery line and the fluid supply line and coupled to a pressurized air supply in a charge step;
after a predetermined charge time coupling the at least one filter(s) in backwash mode to the fluid backwash line in a water purge step;
after a predetermined purge time, initiating an air purge step wherein the at least one filter(s) in backwash mode has an air purge outlet opened and the fluid recovery line opened for a predetermined time period to purge air from the at least one filter(s) in the backwash mode; and
returning the at least one of the filter(s) to full filter mode.

13. The method of claim 12 wherein the predetermined system condition is a preset time period.

14. The method of claim 12 wherein the isolation and coupling between the plurality of filters, the fluid recovery line, the fluid supply line and the fluid backwash line is via a plurality of valve assemblies controlled by a control section.

15. The method of claim 14 wherein the charge time and the purge time are configurable at the control section.

16. The method of claim 14 wherein said control section will continue to alternate said filters between said full filter mode and said backwash mode so long as the wash system is operating.

17. The method of claim 14 wherein, when the wash system is not operating, said control section will initiate a backwash mode for said filters from time to time.

18. The method of claim 12 wherein upon completion of the backwash mode the at least one filter in backwash mode is refilled with water and the charge step and the purge step repeated at least once before returning to full filter mode.

19. The method of claim 12 wherein upon completion of a backwash mode upon at least one of the filter(s), upon a next predetermined system condition the backwash mode is initiated with respect to a different group of at least one of the filter(s).

* * * * *